(12) United States Patent
Callaghan et al.

(10) Patent No.: US 8,312,447 B2
(45) Date of Patent: Nov. 13, 2012

(54) MANAGING UPDATES USING COMPILER AND LINKER INFORMATION

(75) Inventors: David M. Callaghan, Kirkland, WA (US); Russell B. Keldorph, Seattle, WA (US); Leonard Ciprian Mosescu, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1057 days.

(21) Appl. No.: 12/237,778

(22) Filed: Sep. 25, 2008

(65) Prior Publication Data

US 2010/0077387 A1     Mar. 25, 2010

(51) Int. Cl.
G06F 9/445      (2006.01)
G06F 9/45       (2006.01)

(52) U.S. Cl. .................... 717/175; 717/168; 717/140

(58) Field of Classification Search .................. 717/140, 717/168
See application file for complete search history.

(56) References Cited

U.S. PATENT DOCUMENTS

| | | | |
|---|---|---|---|
| 4,558,413 A | | 12/1985 | Schmidt et al. |
| 5,367,683 A | * | 11/1994 | Brett .............. 717/136 |
| 5,410,703 A | * | 4/1995 | Nilsson et al. ......... 717/168 |
| 5,535,392 A | * | 7/1996 | Brett .............. 717/145 |
| 6,594,822 B1 | | 7/2003 | Schweitz et al. |
| 6,757,893 B1 | | 6/2004 | Haikin |
| 6,760,908 B2 | | 7/2004 | Ren |
| 6,986,132 B1 | * | 1/2006 | Schwabe ............... 717/168 |
| 7,031,972 B2 | | 4/2006 | Ren et al. |
| 7,331,035 B2 | * | 2/2008 | Loos et al. ............ 717/104 |
| 7,562,077 B2 | * | 7/2009 | Bisson et al. ............ 1/1 |
| 7,689,982 B1 | * | 3/2010 | Chen et al. ............ 717/168 |
| 7,694,291 B2 | * | 4/2010 | Chen et al. ............ 717/162 |
| 7,856,618 B2 | * | 12/2010 | Donovan et al. ........ 717/107 |
| 7,958,502 B2 | * | 6/2011 | Motta et al. ........... 717/168 |
| 2004/0194078 A1 | * | 9/2004 | Shen ............... 717/168 |
| 2005/0033767 A1 | * | 2/2005 | Kamentz et al. ........ 707/104.1 |
| 2005/0198630 A1 | * | 9/2005 | Tamma et al. ......... 717/175 |
| 2007/0050762 A1 | | 3/2007 | Chen et al. |
| 2007/0220504 A1 | * | 9/2007 | Eker ............... 717/168 |
| 2007/0274598 A1 | | 11/2007 | Dahms et al. |
| 2010/0174692 A1 | * | 7/2010 | Meyer et al. .......... 707/696 |

FOREIGN PATENT DOCUMENTS

WO      2007071324 A1     6/2007

OTHER PUBLICATIONS

"Navigon v2.1 Update for 5100 Available", Date: Apr. 15, 2008, http://www.gpsreview.net/forums/viewtopic.php?t=5509.
"DF SDK 1.0.2", Retrieved from <<http://www.filedudes.com/DF_SDK-download-43124.html>>, Apr. 2008, pp. 3.
"Navigon", Retrieved from <<http://www.gpsreview.net/forums/viewtopic.php?t=5509>>, Nov. 2006, pp. 2.

* cited by examiner

*Primary Examiner* — Isaac Tecklu
*Assistant Examiner* — Mohammad Kabir

(57) ABSTRACT

Generating a next build version of a software application using information generated during a previous build version at the compiler and linker levels. The information describes the structure and build decisions applied during creation of the previous build version. Generation of the current build version is modified based on the information to minimize the binary differences between the builds. In some embodiments, a linker arranges the contents during the previous build in anticipation of the current build. Further, the linker pads the previous build with unused address space to minimize relocation of the contents of the build.

19 Claims, 7 Drawing Sheets

MANAGING UPDATES USING COMPILER AND LINKER INFORMATION

BACKGROUND

Software development tools foster the development of new software applications. However, the existing systems include limited tools for servicing the software over its lifecycle. For example, none of the tools provides efficient patch deployment capability integrated into the regular development cycle. The existing tools simply take the final binary output of two separate build passes and attempt to create an incremental update.

In some contexts, the incremental updates created by existing systems are still too large. For example, when sending an over-the-air update to a mobile computing device, such as a mobile phone or a personal digital assistant (PDA), even a small incremental update may consume a significant amount of bandwidth. This prevents other applications from using the bandwidth, and consumes battery power. This in turn degrades the user experience. The existing systems fail to provide incremental updates that are suitable for transmission to mobile computing devices. Efficiencies with building the next version of a software-based application or system using knowledge of the previous version offer distribution and installation benefits to even personal computer based systems.

SUMMARY

Embodiments of the invention minimize the size of incremental updates to a software application by capturing information during the compilation and linking level operations. This information is passed to subsequent builds of the application or system to minimize the size of the changes to upgrade to the next version. The information describes a structure of the first build and one or more build decisions applied during generation of the first build. Upon modification of the software application, a second build is created. The information generated from the first build is used during creation of the second build to minimize the binary difference between the first build and the second build.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the invention create builds, images, or other data representing a software application with minimal binary differences to enable efficient delivery of incremental updates to computing devices. The optimization occurs at the compiler and/or linker level on a computing device 102 to produce builds with consistent structure and organization. The consistent structure and organization minimizes the size of incremental updates based on binary differences between the builds. The binary differences are produced by, for example, a binary difference tool to produce patches as small as possible. The minimized size of the incremental updates takes less bandwidth for transmission, thus providing economic advantages and efficiency when delivering and installing the updates. In general, output from one build is incorporated into the next build creation. Changes to the binary output resulting from source code changes are arranged in an efficient way facilitating serviceability. Aspects of the invention track code and data changes to prevent program counter address cascade churn.

When layout decisions are made to move a component to a new location, this information is passed to the tools that generate incremental differences which are applied to move or upgrade from one version of the software to the next.

While described in some embodiments with reference to the computing device 102 including a mobile computing device, aspects of the invention are operable with other devices such as laptop computers, gaming consoles, handheld navigation devices, or any other devices communicating with the second computing devices.

Figure 1:
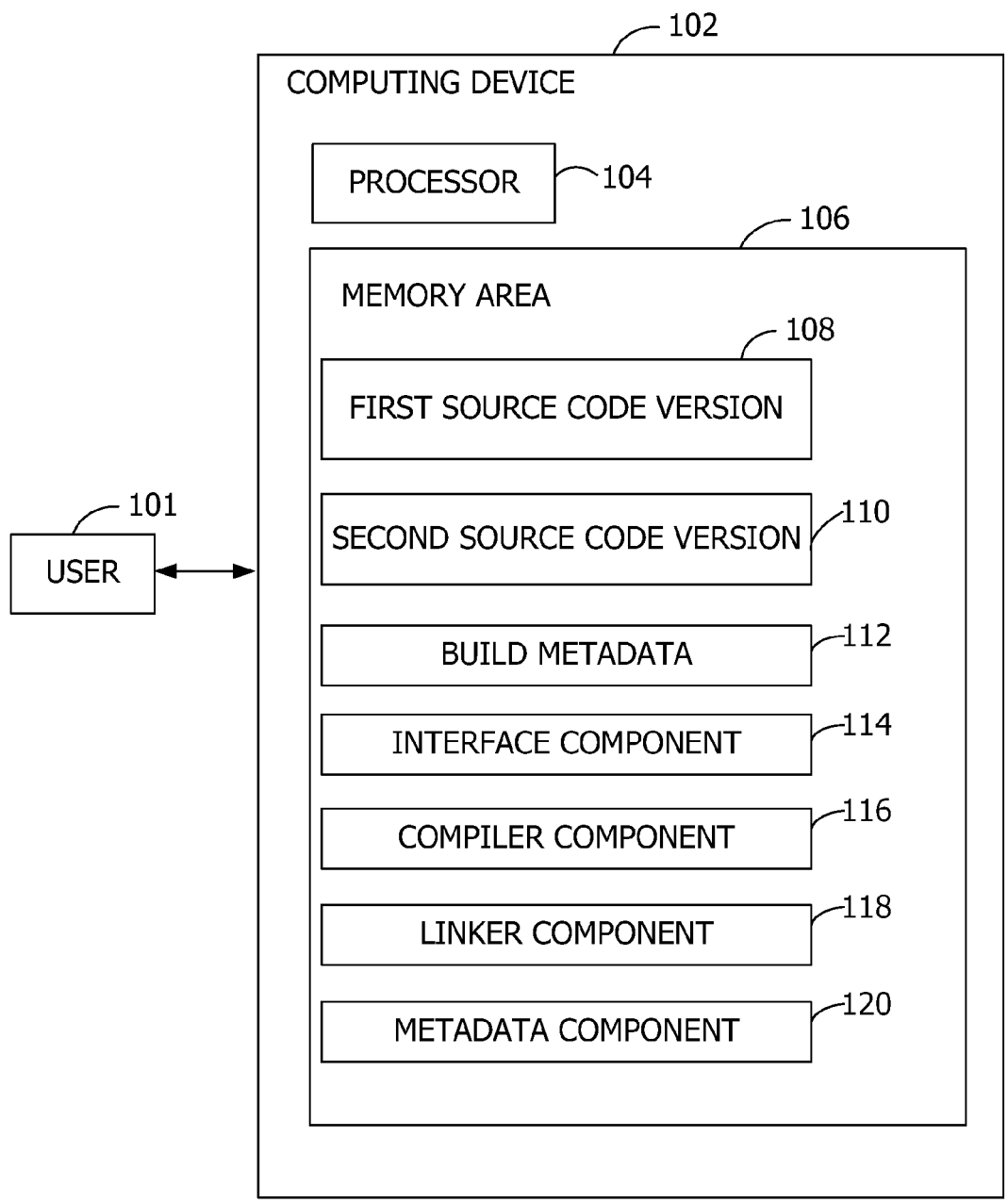
FIG. 1 is an exemplary block diagram illustrating a computing device for generating a build of an application program.

Referring again to FIG. 1, an exemplary block diagram illustrates a user 101 interacting with the computing device 102. The computing device 102 includes a processor 104 and a memory area 106, or other computer-readable media. The memory area 106 stores one or more computer-executable components such as an interface component 114, a compiler component 116, a linker component 118, and a metadata component 120. Operation of these components is described with reference to FIG. 4 below.

The memory area 106 further stores a first source code version 108 of a software application, program, product, or other logic. While aspects of the invention are described with reference to software, embodiments of the invention are operable with instructions in any form including hardware and firmware. The memory area 106 further stores a second source code version 110 of the software application. The second source code version 110 is created by, for example, the user 101. The memory area 106 further stores build metadata 112. The build metadata 112 is generated during a build of the first source code version 108 of the software application. The build corresponds to code in a format supported by an operating system. As described in detail below, the build metadata 112 describes one or more of the following occurring during generation of the build: function inlining, loop unrolling, expression optimizations, and other transformation and optimizations. The build metadata 112 refers to any information generated and persisted during the build that is not for running or loading the generated binary executable, but aids in maintenance tasks such as debugging, code coverage, and collecting statistics. The build metadata 112 may be persisted in files. Exemplary build metadata 112 and/or debugging information includes, for example, type information, symbol definitions, mapping between the location of final code and the original source code, mapping between source data objects and the final location and layout, function sizes, information about the code flow (e.g., number of basic blocks, arcs) and cross references and locality changes such as moving a subsection to a new region to prevent a cascade of changes when a section outgrows available free space buffer.

While described with reference to build metadata 112, embodiments of the invention are operable with other ways of storing relevant information such as, for example, specialized files.

Figure 2:
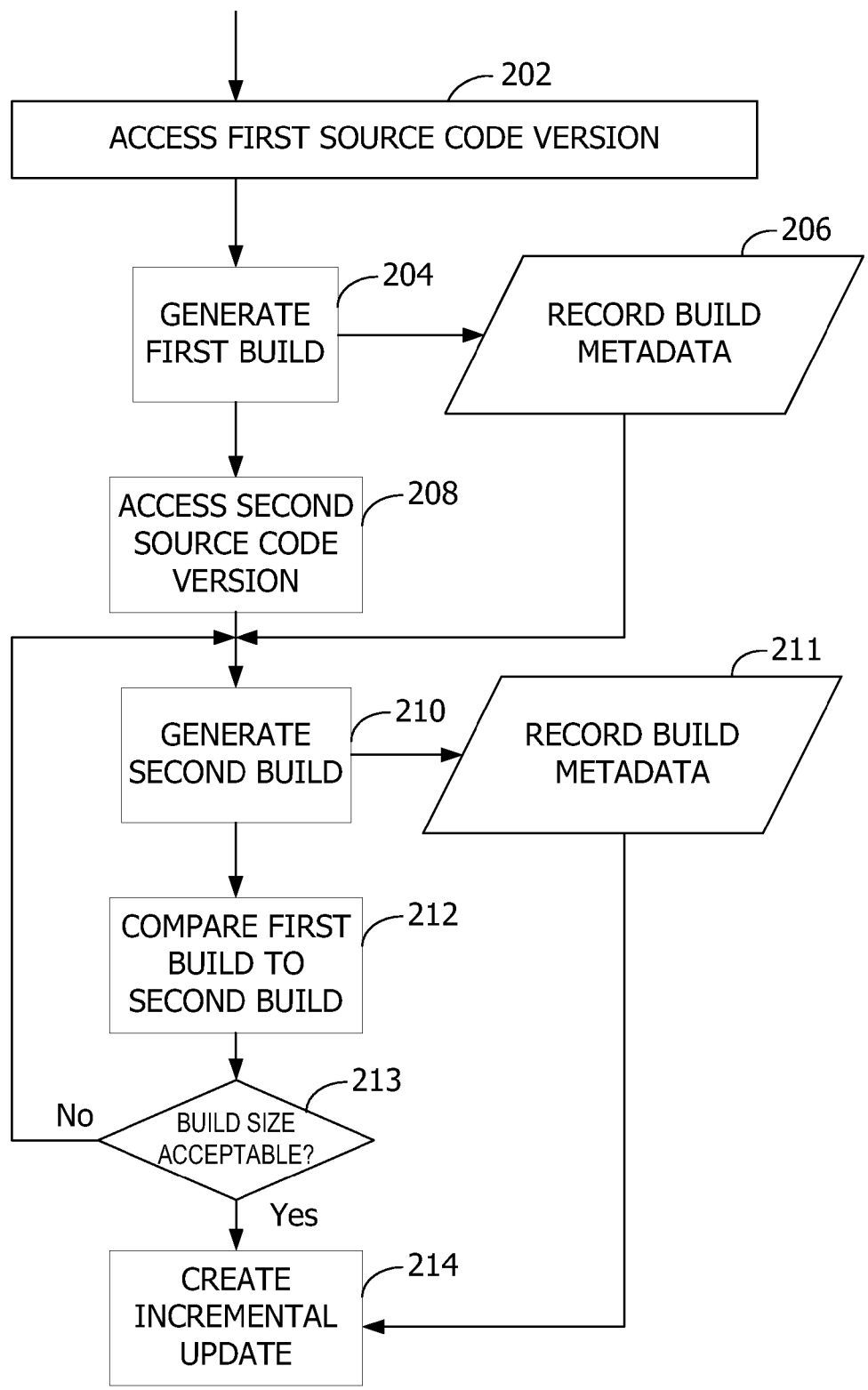
FIG. 2 is an exemplary flow chart illustrating generation of a second build using metadata determined from generation of a first build.

Referring next to FIG. 2, an exemplary flow chart illustrates generation of a second build using the build metadata 112 determined from generation of a first build. At 202, the first source code version 108 is accessed. At 204, the first build is generated, in anticipation of a subsequent build such as the second build. Build metadata 112 created during generation of the first build is recorded at 206. The build metadata 112 generally describes a structure of the first build, one or more build decisions applied during the generation of the first build, and, in some embodiments, the localities of source code functions in the associated sections.

For example, one or more inlined functions, unrolled loops, or expression transformations within the first build are identified. Heuristics are examined to decide whether to inline any of the functions in the first source code version 108. The decisions are recorded in the build metadata 112. When a function is modified by an update, every inlined calling function may need to be modified as well. Since inlining tends to increase or magnify the impact of a source code change, the compiler is conservative in its decision to inline functions, in some embodiments.

Loop unrolling is guided by heuristics to balance the benefits of larger code versus faster run-time. The loop unrolling decisions are recorded in the build metadata 112. For any given code segment, there are numerous possible expression transformations that preserve the semantics of the expressions based on the exact source expression. As such, even slight changes with small semantic impact may trigger a different set of transformations resulting in significantly different final expressions. As such, the exact transformation expressions are recorded in the build metadata 112, with the intent that the compiler will recreate the same final optimized expressions in a subsequent build. The compiler decision to recreate the same final optimized expressions is directly related to processing the previous build decision information; whereas a standalone build (e.g., without the previous build metadata 112) results in a significantly different output layout. The size of the output of a software delta or difference algorithm is proportional to the entropy of the changes to the system. Passing the build-to-build change information into the incremental update process improves the likelihood that the algorithms will find the smallest possible incremental update when deploying the changes.

Other information recorded in the build metadata 112 includes pattern matching tests or other optimizations. In this example, small changes in the source code may change the result of pattern matching. As such, the results of various pattern matching tests are recorded in the build metadata 112 for use by the compiler in a subsequent build.

The second source code version 110 is accessed at 208. For example, the user 101 modifies the first source code version 108 to create the second source code version 110. The second build is generated at 210 based on the structure of the first build and the build decisions applied during generation of the first build. The build decisions are recorded at 211, and may include the information recorded at 206. For example, one or more of the build decisions from the first build are applied to the second build for consistency across the builds. Accordingly, in some embodiments, the second build has a structure substantially similar to the structure of the first build.

The first build is compared to the second build at 212. The comparison may be a simple binary compare examining each bit of the data between the two copies for identical information. The comparison may also be an intelligent comparison of the changes occurring in the various output sections. Based on the comparison, if the reuse of build settings does not produce an acceptably small amount of churn at 213 (e.g., the build size is not acceptably small enough), the build flow may return to repeat the second build at 210 iterating through reusing only a subset of the build metadata recorded at 206. The build flow may be programmed to product a build break if the churn between operations 204 and 210 is not below an acceptable percentage after successive iterations. In this exemplary scenario, the developers and testers may be called upon to produce a different design change at 208 that will result in minimal update size. If the comparison at 212 yields an acceptable set of changes, an incremental update is created at 214. The algorithms used in the generation of the incremental update 214 benefit from the build information recorded at 206 and 211. The incremental update, when applied to the computing device 102 storing the first build, converts the first build to the second build. The operations illustrated in FIG. 2 minimize a size of the created incremental update based on the build metadata 112.

Figure 3:
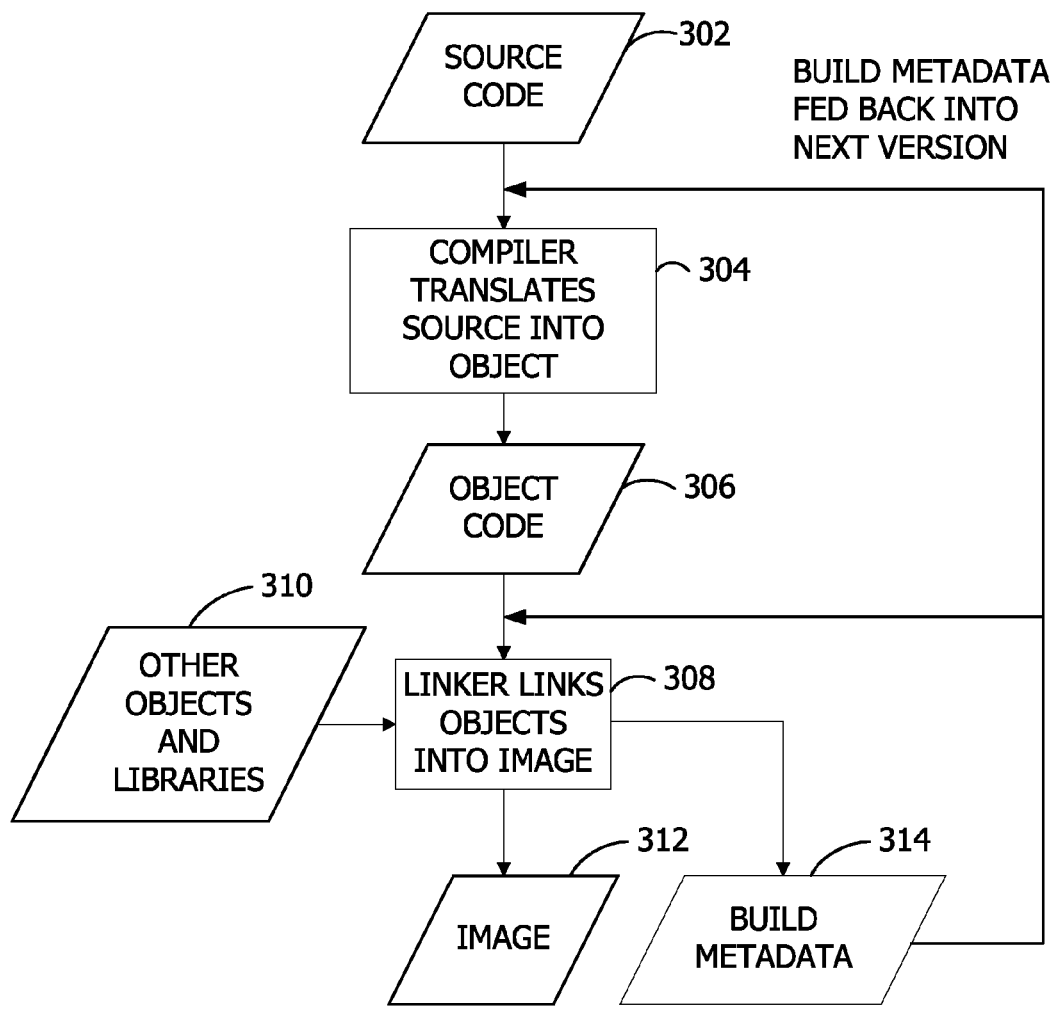
FIG. 3 is an exemplary flow chart illustrating compiling and linking of source code into object code.

Referring next to FIG. 3, an exemplary flow chart illustrates compiling and linking of source code into object code. Source code from 302 is translated at 304 by a compiler into object code at 306. The object code includes one or more objects or object files. A linker links at 308 the objects into an image or other build such as image 502 in FIG. 5 or other image file at 312, using other objects or libraries from 310. The linker also creates the build metadata 112 at 314.

The build metadata 112 is fed back into the compiler and the linker during compiling and linking of a subsequent version of the source code (e.g., after modification of the source code). For example, the compiler includes a command line switch or argument to identify the build metadata 112 to guide the compilation. Alternatively or in addition, a command line switch indicates a preference of the user 101 for optimization favoring serviceability (e.g., ability to update) or performance (e.g., the user 101 specifies a value between one and ten). The preference is used to determine, for example, an amount of padding to include (see FIG. 6 below). The command line switch may also be used to disable the optimizations described herein in favor of, for example, other optimization schemes.

Figure 4:
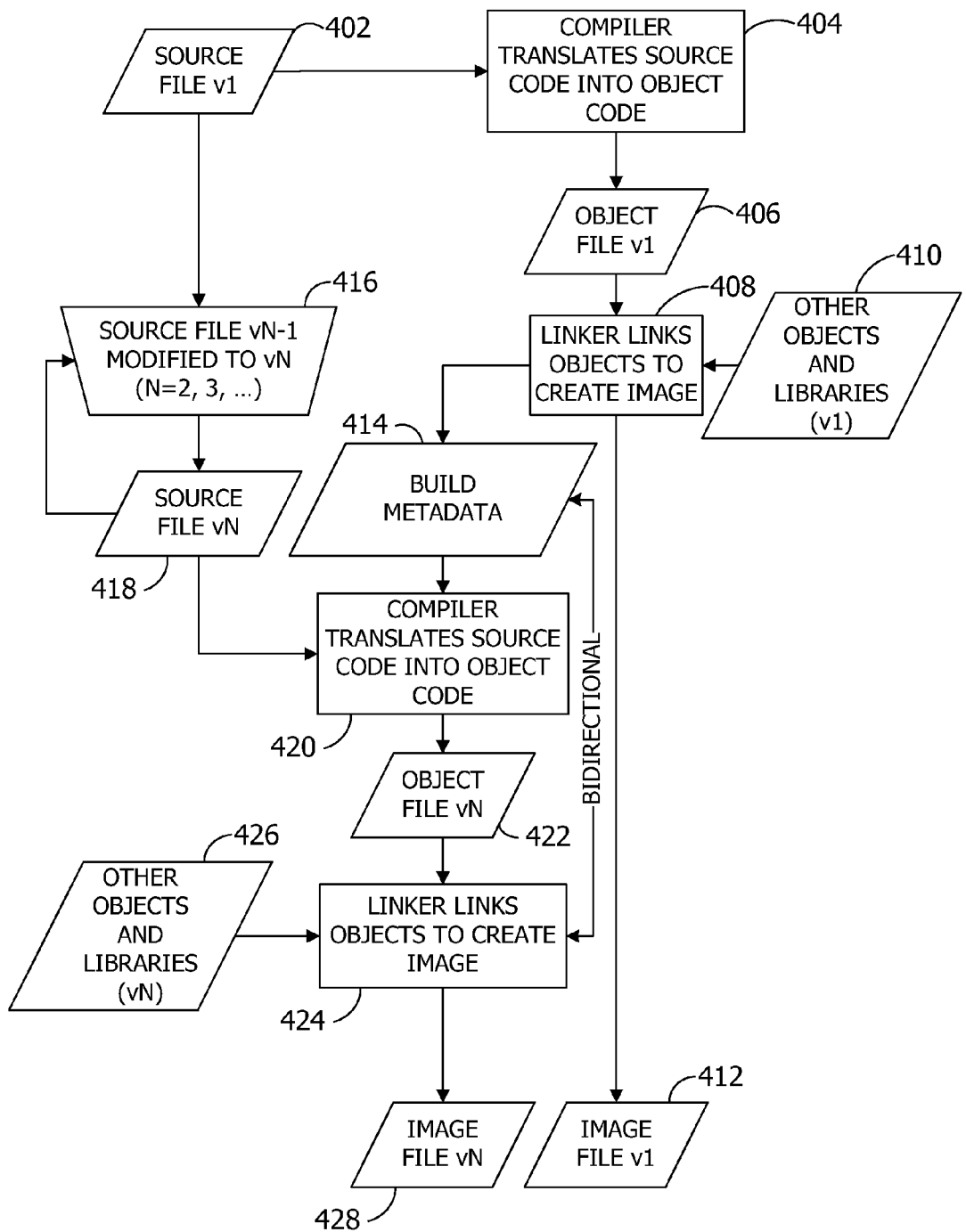
FIG. 4 is an exemplary flow chart illustrating the creation of image files from source code such that the difference between the image files is minimized.

Referring next to FIG. 4, an exemplary flow chart illustrates the creation of image files from source code such that the difference between the image files is minimized. In the example of FIG. 4, a source file v1 containing source code is accessed at 402. The compiler translates the code from the source file v1 into object code at 404. The object code is stored as an object file v1 at 406. The linker links at 408 the objects in the object file v1, other objects, and other libraries at 410 to create an image file v1 at 412. Build metadata 112 is also created at 414.

The source file vN-1 is modified at 416 to create source file vN at 418, wherein N is a positive integer greater than 1. The compiler translates at 420 the source file vN at 418 based on the build metadata 112 from 414 to create an object file vN at 422. In some embodiments, the compiler uses the build metadata 112 to trigger a warning if a difference between the source files vN and vN-1 is larger than a defined threshold. This may indicate unexpected build variations (e.g., including different version of external headers or changing optimization switches). The compiler makes transformation decisions that do not increase contribution size in order to decrease the likelihood that the linker will have to move a contribution. The linker may decide, based on the build metadata 112, whether to insert new padding if the existing padding is consumed.

The linker links at 424 the objects from the object file vN at 422, other objects, and other libraries at 426 based on the build metadata 112 from 414 to create an image file vN at 428. The binary difference between the image file vN-1 and vN are minimized due in part to the use of the build metadata 112 at the compiler and linker levels. The build metadata 112 tracks the previous linker layout of all v1 object files 406 and ensures any newly added object files vN at 422 do not cause major changes to the original layout.

Figure 5:
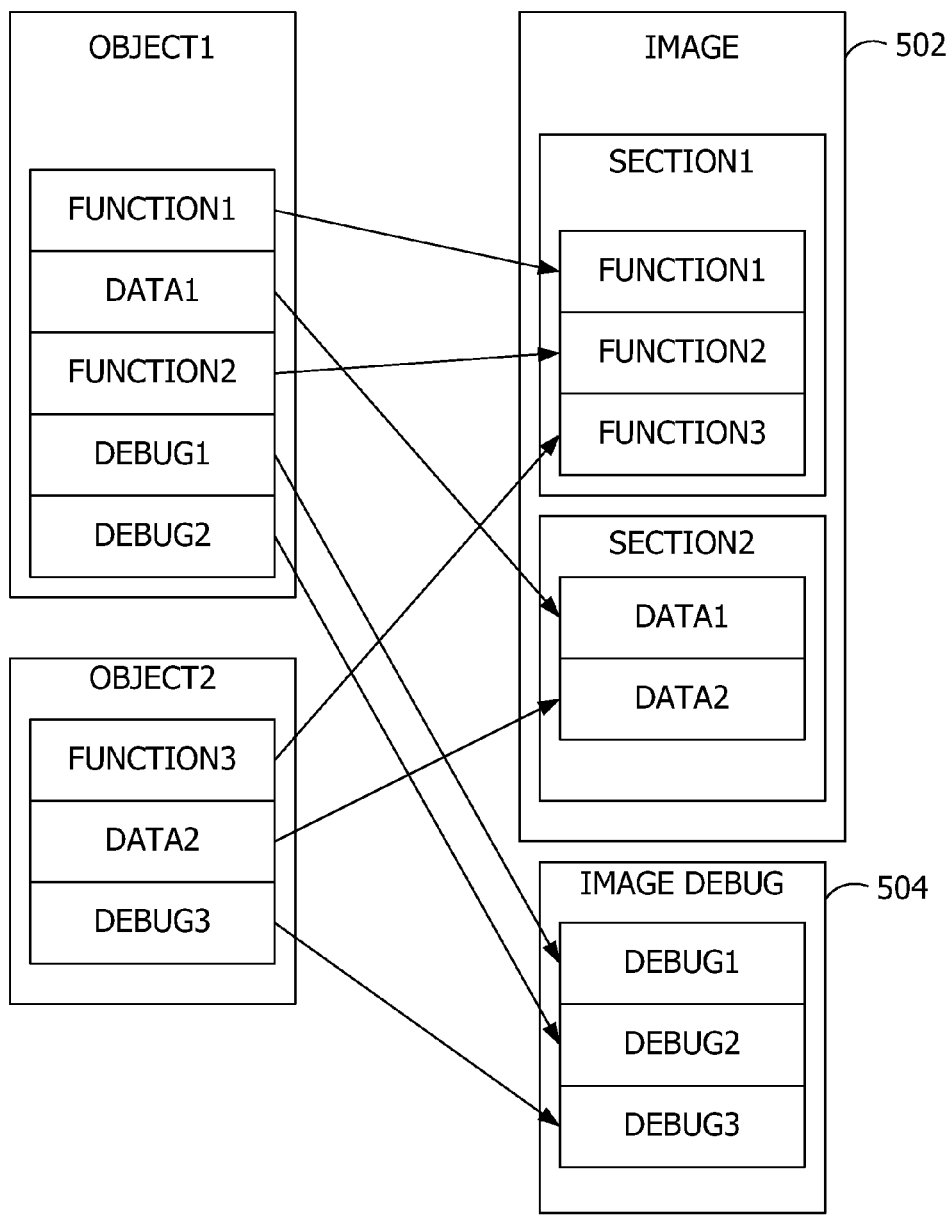
FIG. 5 is an exemplary block diagram illustrating the arrangement of contributions into an image file.

Referring next to FIG. 5, an exemplary block diagram illustrates the arrangement of objects by the linker into images 502, 504. The goal of the linker is to create the images, which represent units of execution loadable by an operating system. The linker creates the image 502 by combining one or more object files created by a compiler or assembler. Each object file includes one or more contributions. Contributions are indivisible, in some embodiments, in that contributions occupy a contiguous region of the image 502. Inside the image 502, contributions are organized into sections according to their type. For example, function contributions are grouped together into a section, while data contributions are grouped together.

The manipulation of the elements in FIG. 5 may be described with reference to the computer-executable components from FIG. 2. The interface component 114 receives source code for the software program from, for example, the user 101. The compiler component 116 compiles the source code received by the interface component 114 into a plurality of object files. The plurality of object files includes one or more of the contributions such as functions or data. In the example of FIG. 5, the objects include Object1 and Object2. The contributions in Object1 include Function1, Data1, Function2, Debug1, and Debug2. The contributions in Object 2 include Function3, Data2, and Debug3.

The linker component 118 links the object files compiled by the compiler component 116 into the image 502. The linker component 118 arranges the contributions to reduce relocation of the contributions during compiling and linking of subsequent updates to the source code. For example, the linker component 118 arranges the contributions by separating contributions with a high frequency of reference from each other. Relocation of such contributions during a subsequent linking may prompt the relocation of many other contributions, which is undesirable. For example, changing a contiguous set of bytes to different values but maintaining the set size avoids cascading effects on relative or absolute references by maintaining the locations of as many contributions as possible. Similarly, if one of the contributions remains the same size or shrinks from one version to the next, the contribution is left in its location without affecting anything else in the image 502. Rather, the linker favors relocation of contributions having a low frequency of reference, if relocation is called for. For example, if a contribution with many references grows beyond the space allocated to it (e.g., including any padding), one of the contributions with few references may be moved resulting in fewer incidental differences than if the growing contribution had been moved. This enables the linker to maintain as much of the arrangement as possible during a linking of objects compiled from a subsequent version of the source code. The order of contributions is maintained as much as possible to avoid cascading differences to the locations of other contributions in the image 502.

An example method for managing contributions is next described. Each of the rules is applied to all contributions before the next is applied. For example, all removed contributions are processed before processing growing contributions. If a contribution from the previous image no longer exists in the new image, padding is inserted in its place so that the locations of surrounding contributions do not change. If a contribution in the new image is larger than its corresponding contribution in the previous image, and there is sufficient padding after it to contain the additional size, the contribution is expanded in place, removing padding as appropriate. Otherwise, either the contribution or one or more subsequent contributions are moved. If a contribution is present in the new image but not the previous image and padding of sufficient size to contain the contribution is present in the new image, the padding is replaced by the new contribution. Otherwise, the contribution is placed at the end of the section. All additions that take the place of padding are added according to a standard bin-packing algorithm, such as "first fit" or "best fit," in an embodiment. If a contribution in the new image is of the same size or smaller than the corresponding contribution in the previous image, the location of the new contribution is kept the same, with padding inserted after the contribution to make up the difference in size, if any.

In some embodiments, entire sections of contributions are moved. If moving one of the sets of contributions necessitates increasing the size of the section and moving another set does not, then the set of contributions that does not necessitate increasing the section size is moved. In this case, the moved set of contributions takes the place of padding somewhere in the image. Otherwise, the set of contributions with the fewest external references is moved to minimize the impact on other contributions.

In some embodiments, if all padding is exhausted when moving or adding a contribution, the contribution may be appended to the end of its section, increasing the section's size and changing the locations of subsequent sections. In other embodiments, a new section of the same type at the end of the image is allocated rather than increasing the size of the existing section.

The linker also groups the contributions such as shown in FIG. 5 into the images 502, 504. The image 502 includes two sections, one for functions and one for data. For example, Section1 includes Function1, Function2, and Function3. Section2 includes Data1 and Data2. In the example of FIG. 5, a separate image debug 504 or other file includes contributions Debug1, Debug2, and Debug3. In other embodiments (not shown), the image debug 504 file is included in the image 502.

Figure 6:
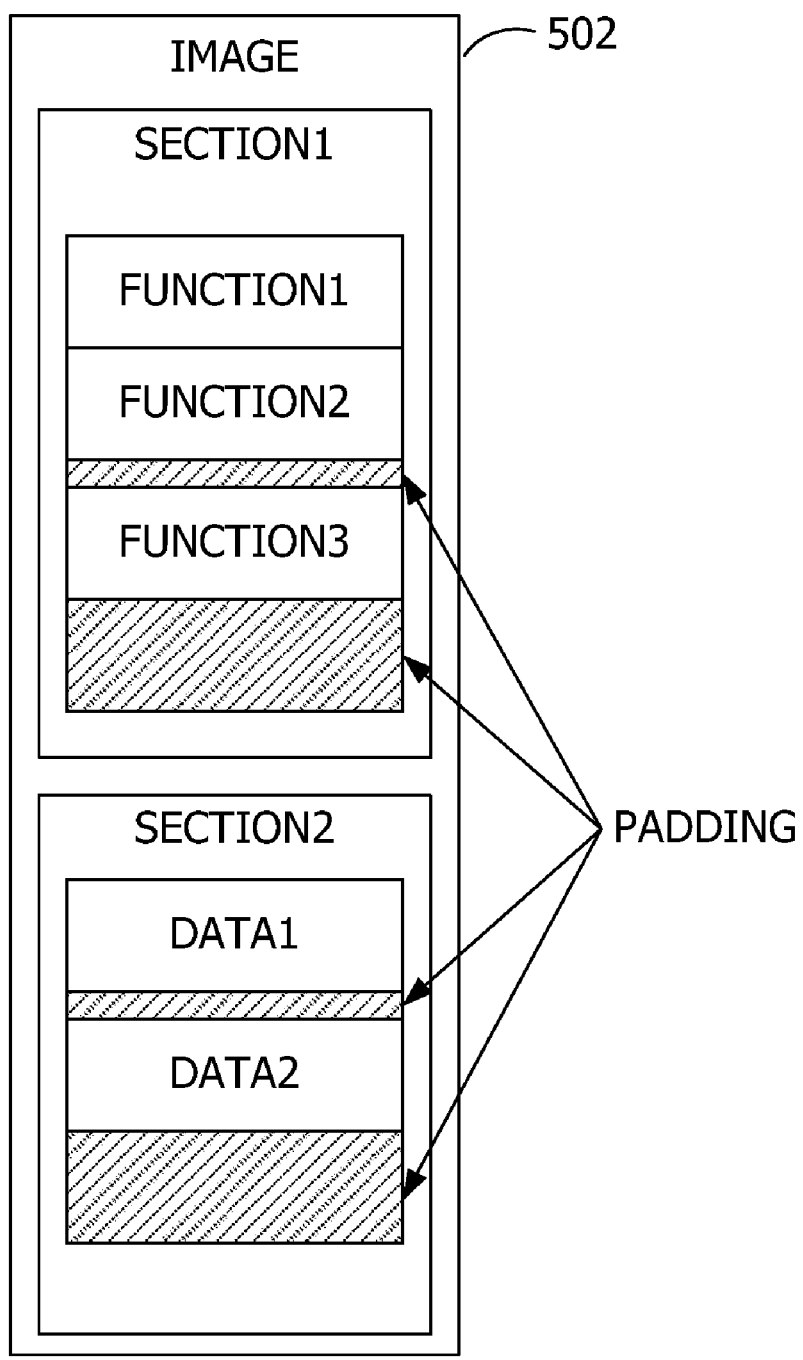
FIG. 6 is an exemplary block diagram illustrating padding the contributions in anticipation of future changes to the contributions.

Referring next to FIG. 6, an exemplary block diagram illustrates padding the contributions in anticipation of future changes to the contributions. The linker component 118 allocates space for future updates by padding the image 502 with unused address space in anticipation of an update to the source code associated with the contributions shown in FIG. 6. In the example of FIG. 6, padding is inserted after Function2 and Function3 in Section1, and after Data1 and Data2 in Section2. In some embodiments, the interface component 114 receives from the user 101 an indication of a desired size of the unused address space, and the linker component 118 pads the image file in accordance with the indicated size.

The padding is distributed in such a way as to localize the impact of any particular difference. Padding is inserted throughout each section in an image, but not necessarily evenly. In some embodiments, more padding is inserted after contributions deemed to have more impact when moved. For example, if a contribution is referenced from many other contributions, more padding is inserted after it to increase the likelihood that the contribution remains at the same location in subsequent versions (e.g., referencing contributions are not affected by a growth in size). In addition, a large portion of padding is reserved for the end of each section to accommodate additional contribution and contributions that grow beyond their previously allocated size.

The metadata component 120 identifies locations of the unused address space and the contributions as input for the compiling and linking of the update to the source code. For example, this enables the linker to store one or more new contributions included in the update in the unused address space.

In some embodiments, the linker provides a report of the differences encountered in the image files so that the user 101 may identify expected and unexpected differences or differences that have more impact than expected.

Some embodiments of the invention generate two iterations of the first build: one with optimizations in anticipation of the second build, and one without optimizations. Feedback is provided to the user 101 or other developer to enable the user 101 to understand the costs associated with the optimizations (e.g., increased size of the first and second builds).

Figure 7:
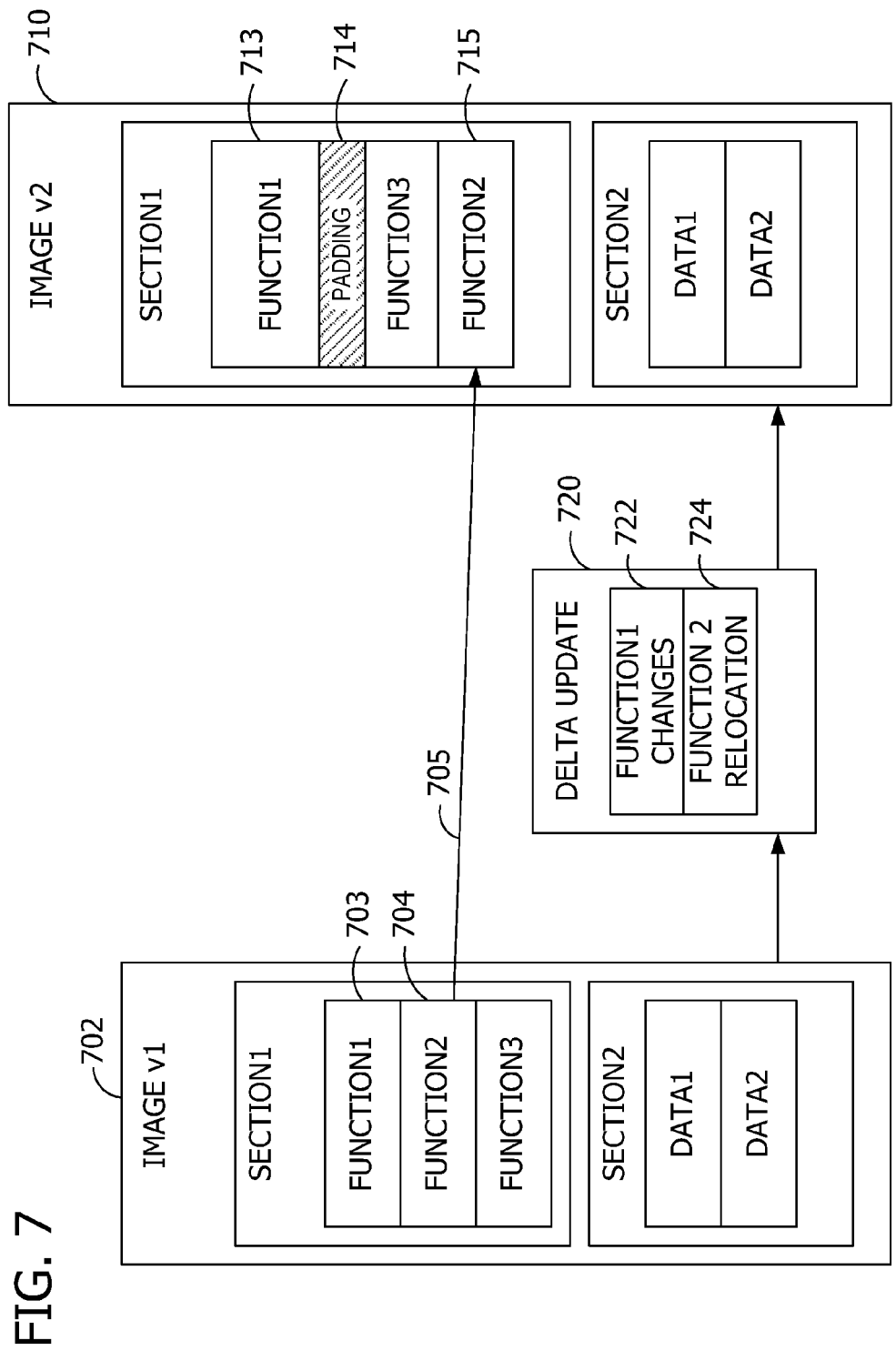
FIG. 7 is an exemplary block diagram illustrating generating incremental delta updates based upon relocation information.

Referring next to FIG. 7 and again to FIG. 2, an exemplary block diagram illustrates layout of executables image v1 702 and image v2 710 which represent internal views of the output from the build operations at 204 and 210, respectively, from FIG. 2. During the build, the size of Function 1 703 grows in size resulting in Function 1 713 in image v2 710. The build system determines based upon the build metadata 112 recorded at 206 and 211 that a new padding section 714 should be introduced and that Function 2 704 in image v1 702 should be relocated to the location of Function 2 715 in image v2 710. The relocation information of Function 2 is indicated by arrow 705. A future minimal incremental update may leverage this information to simply relocate the Function 2 704 to Function 2 715, rather than attempt to auto correlate or migrate the data values from the location of Function 2 704 to the location of Function 2 715.

When an incremental update is generated at 214 in FIG. 2, the output is shown as incremental update 720. This incremental update 720 contains the Function 1 changes 722 to transform Function 1 703 into Function 1 713 (e.g., the executable code added to Function 1 703). The incremental update 720 also contains the Function 2 relocation changes 724 related to the relocation of Function 2 704 to Function 2 715. When a device running image v1 702 receives the incremental update 720, the device applies these changes to transform the image v1 702 into image v2 710. The delta application leverages the Function 2 relocation 724 information to convert Function 2 704 to Function 2 715 as well as apply the incremental Function 1 changes 722 to transform Function 1 703 into Function 1 713.

Exemplary Operating Environment

By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

The embodiments illustrated and described herein as well as embodiments not specifically described herein but within the scope of aspects of the invention constitute exemplary means for minimizing a size of the incremental update based on the build metadata 112, and exemplary means for generating the first build in anticipation of the second build.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for optimizing software updates for delivery to a mobile computing device, said system comprising:
    a memory area for storing a first source code version of a software application and a second source code version of the software application, wherein the first source code version and the second source code version are different; and
    a processor programmed to:
        access the first source code version of the software application stored in the memory area;
        generate a first build of the accessed first source code version by at least compiling the accessed first source code version;
        determine build metadata related to generation of the first build, said determined build metadata describing a structure of the first build and one or more build decisions applied during the generation of the first build;
        access the second source code version of the software application stored in the memory area;
        generate a second build of the accessed second source code version by at least compiling the accessed second source code version based on the described structure of the first build and based on the build decisions applied during generation of the first build;
        compare the first build to the second build; and
        create an incremental update to the first build based on the comparison, wherein a size of the created incremental update is minimized based on the build metadata.

2. The system of claim 1, wherein the second build has a structure substantially similar to the structure of the first build.

3. The system of claim 1, wherein the build metadata further describes localities of one or more source code functions in one or more associated sections.

4. The system of claim 1, wherein the build metadata describes one or more of the following: function inlining, loop unrolling, and expression optimizations.

5. The system of claim 1, further comprising means for minimizing a size of the incremental update based on the build metadata.

6. The system of claim 1, further comprising means for generating the first build in anticipation of the second build.

7. A method comprising:
    accessing information related to generation of a first build of a first source code version of a software application, said information describing a structure of the first build and one or more build decisions applied during generation of the first build;
    receiving one or more modifications to the first source code version to create a second source code version, wherein the first source code version and the second source code version are different;
    generating a second build of the second source code version by at least compiling the second source code version based on the described structure of the first build and based on the build decisions applied during generation of the first build, wherein a structure of the generated second build is related to the described structure of the first build, and wherein generating the second build comprises applying at least one of the build decisions from the first build; and
    generating an incremental update to the first build based on a comparison of the second build to the first build, wherein a size of the generated incremental update is minimized based on the accessed information.

8. The method of claim 7, wherein generating the second build comprises generating the second build such that the structure of the second build is substantially similar to the structure of the first build.

9. The method of claim 7, further comprising generating the first build in anticipation of said generating the second build.

10. The method of claim 7, wherein generating the second build comprises compiling the second source code version into objects and linking the objects into an image.

11. The method of claim 7, further comprising identifying one or more inlined functions within the first build based on the accessed information.

12. The method of claim 7, further comprising identifying one or more unrolled loops within the first build based on the accessed information.

13. The method of claim 7, further comprising identifying one or more expression transformations within the first build based on the accessed information.

14. One or more computer storage media having computer-executable components for producing a minimized incremental update to a software program, said components comprising:
    an interface component for receiving source code for the software program;
    a compiler component for compiling the source code received by the interface component into a plurality of object files, said plurality of object files comprising one or more contributions;
    a linker component for linking the object files from the compiler component into a first image file, wherein the linker component pads the first image file with unused address space in anticipation of an update to the source code, wherein the linker component further arranges the contributions to reduce relocation of the contributions during compiling and linking of the updated source code, an amount of padding of the unused address space being determined by a user preference; and
    a metadata component for identifying locations of the unused address space and the contributions, wherein the updated source code is compiled and linked using at least the identified locations as input to create a second image file, and wherein an incremental update to the first image file is generated based on a comparison of the second image file to the first image file, whereby a size of the generated incremental update is minimized based on the identified locations.

15. The computer storage media of claim 14, wherein the linker component arranges the contributions by separating contributions with a high frequency of reference from each other.

16. The computer storage media of claim 14, wherein the linker component maintains the arrangement of the contributions during linking of the update to the source code.

17. The computer storage media of claim 14, wherein the linker component relocates contributions with a low frequency of reference during linking of the update to the source code.

18. The computer storage media of claim 14, wherein the interface component receives from a user an indication of a size of the unused address space, and wherein the linker component pads the image file in accordance with the indicated size.

19. The computer storage media of claim 14, wherein, during compiling and linking of the update to the source code, the linker component stores one or more contributions included in the update in the unused address space.

* * * * *